(12) United States Patent
Rice

(10) Patent No.: US 11,540,494 B2
(45) Date of Patent: Jan. 3, 2023

(54) BEEHIVE EXCLUDER INCLUDING STACKED ROWS OF OPENINGS AND CANTILEVERED EXTENSION CLIPS

(71) Applicant: Highview Holdings LLC., Wexford, PA (US)

(72) Inventor: David Rice, Wexford, PA (US)

(73) Assignee: HIGHVIEW HOLDINGS LLC., Wexford, PA (US)

(*) Notice: Subject to any disclaimer, the term of this patent is extended or adjusted under 35 U.S.C. 154(b) by 0 days.

(21) Appl. No.: 17/031,414

(22) Filed: Sep. 24, 2020

(65) Prior Publication Data

US 2021/0084868 A1  Mar. 25, 2021

Related U.S. Application Data

(60) Provisional application No. 62/905,015, filed on Sep. 24, 2019.

(51) Int. Cl.
*A01K 47/02* (2006.01)
*A01M 29/30* (2011.01)
*A01K 47/06* (2006.01)

(52) U.S. Cl.
CPC .............. *A01K 47/02* (2013.01); *A01K 47/06* (2013.01); *A01M 29/30* (2013.01)

(58) Field of Classification Search
CPC ................................. A01K 47/00; A01K 47/06
(Continued)

(56) References Cited

U.S. PATENT DOCUMENTS

| 9,300 A | * | 10/1852 | Langstroth | ............. | A01K 47/06 449/14 |
| 867,891 A | * | 10/1907 | Marbach | ................ | A01K 47/06 449/21 |

(Continued)

FOREIGN PATENT DOCUMENTS

| CN | 107926867 A | * | 4/2018 | |
| EP | 2888934 A1 | * | 7/2015 | ............. A01K 47/04 |

(Continued)

OTHER PUBLICATIONS

English-language translation of KR 20160096914 (Year: 2016).*
(Continued)

*Primary Examiner* — Brady W Frazier
(74) *Attorney, Agent, or Firm* — Blynn L. Shideler; Krisanne Shideler; BLK Law Group

(57) ABSTRACT

A beehive excluder, for preventing rodent and other animal intrusion, is configured to be coupled to the opening of a beehive and includes a body defining a first upper and second lower row of openings into a beehive. Each opening of each row is configured to allow the bees to land and proceed through the opening without traversing a vertical abutment. The body includes a dividing ridge extending the excluder's width, wherein a plurality of openings include vertical sidewalls extending from the dividing ridge and sloping toward the interior of the beehive. The body is a one piece molded structure and further includes clip members configured to couple the excluder to the beehive, wherein the clip members are formed by a plurality of cantilevered extension members extending into the beehive opening with upwardly extending detent members on distal ends thereof.

14 Claims, 2 Drawing Sheets

(58) Field of Classification Search
USPC .............................................. 449/20, 24, 25
See application file for complete search history.

(56) References Cited

U.S. PATENT DOCUMENTS

| | | | | |
|---|---|---|---|---|
| 1,243,555 A | * | 10/1917 | Reisinger | A01K 47/06 449/25 |
| 1,363,922 A | * | 12/1920 | Rowe | A01K 57/00 449/25 |
| 1,857,709 A | * | 5/1932 | Benton | A01K 47/00 449/16 |
| 2,025,908 A | * | 12/1935 | Schlegel | A01K 47/06 449/25 |
| 3,350,728 A | * | 11/1967 | Root | A01K 47/06 449/19 |
| 3,581,323 A | * | 6/1971 | Rodgers | A01K 47/06 449/21 |
| 5,019,011 A | * | 5/1991 | Williams | A01K 47/06 449/20 |
| 6,364,738 B1 | * | 4/2002 | Kendell | A01K 47/00 449/29 |

FOREIGN PATENT DOCUMENTS

| | | | | |
|---|---|---|---|---|
| EP | 3597036 A1 | * | 1/2020 | ............. A01K 47/06 |
| FR | 2894431 A1 | * | 6/2007 | ............. A01K 47/06 |
| KR | 200175782 Y1 | * | 4/2000 | |
| KR | 200343501 Y1 | * | 3/2004 | |
| KR | 20110024884 A | * | 3/2011 | |
| KR | 200474009 Y1 | * | 8/2014 | |
| KR | 20140005131 U | * | 9/2014 | |
| KR | 20160096914 A | * | 8/2016 | |
| KR | 20180002028 U | * | 7/2018 | |
| KR | 20180088549 A | * | 8/2018 | |
| KR | 20210002535 U | * | 11/2021 | |
| WO | WO-2012011881 A2 | * | 1/2012 | ............. A01K 47/00 |

OTHER PUBLICATIONS

English-language translation of KR 200343501 (Year: 2004).*
U.S. Pat. No. 9,300, Issued Oct. 5, 1852 to Langstroth. Referenced here due to inability of this form to accept the low patent number in the issued patent section.

* cited by examiner

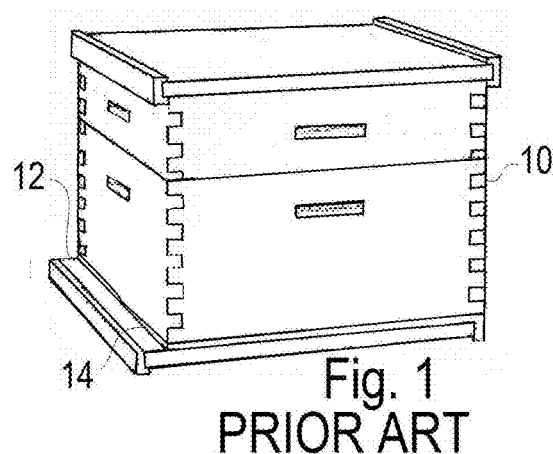
Fig. 1
PRIOR ART
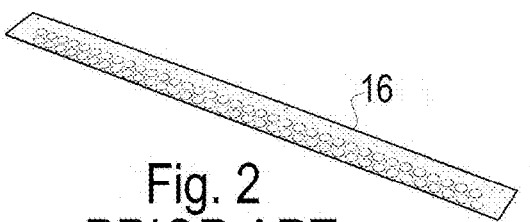
Fig. 2
PRIOR ART
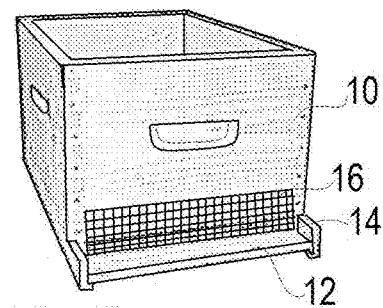
Fig. 3
PRIOR ART
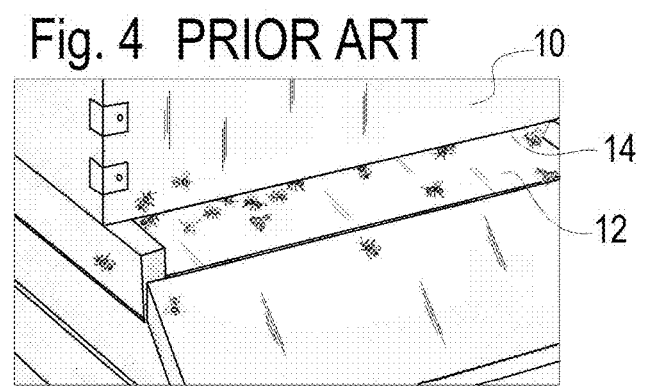
Fig. 4 PRIOR ART
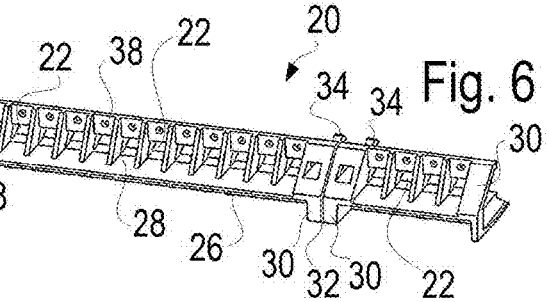
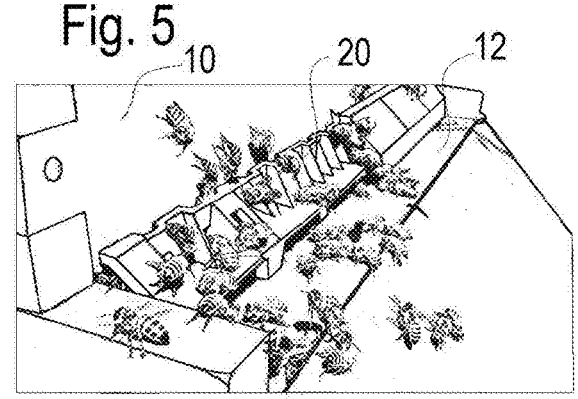
Fig. 5
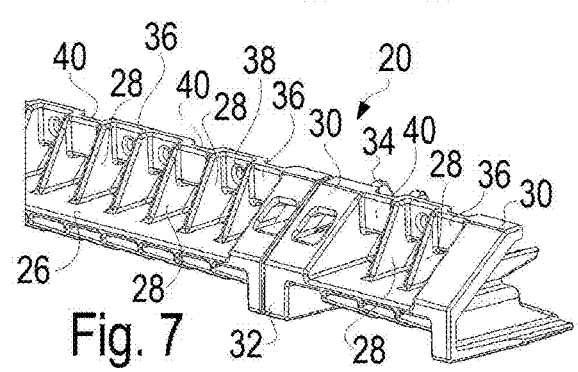
Fig. 7

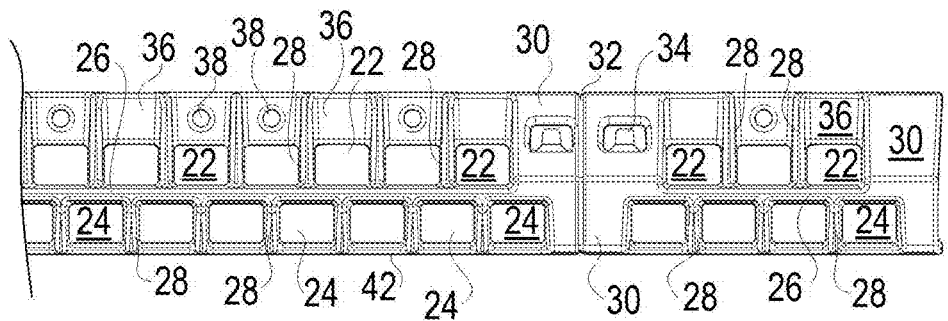
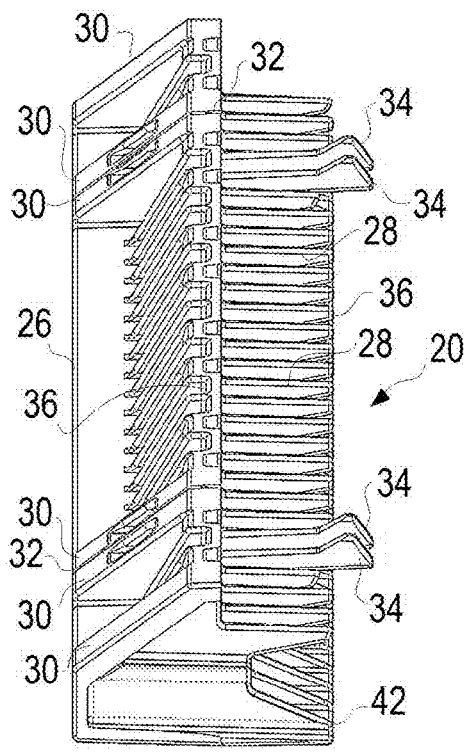
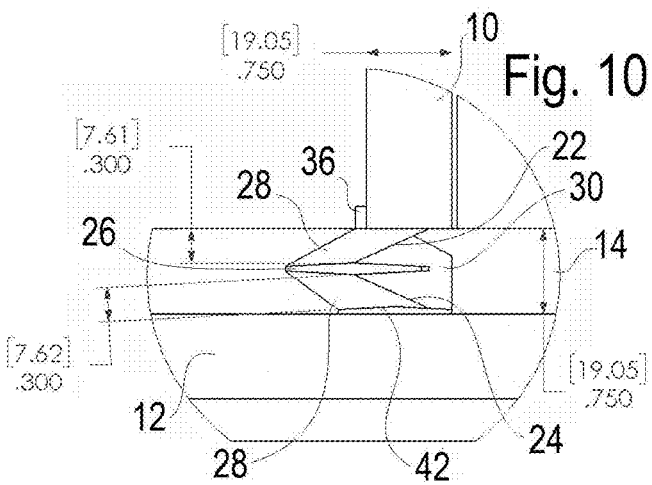
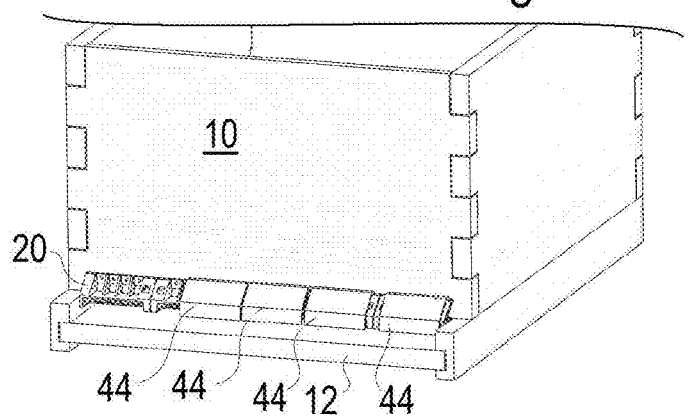

BEEHIVE EXCLUDER INCLUDING STACKED ROWS OF OPENINGS AND CANTILEVERED EXTENSION CLIPS

CROSS-REFERENCE TO RELATED APPLICATIONS

This application claims the benefit of U.S. Provisional Patent Application Ser. No. 62/905,015, titled "Beehive Rodent Excluder", filed on Sep. 24, 2019, which is incorporated herein by reference.

BACKGROUND OF THE INVENTION

1. Field of the Invention

The present invention relates to beehive pest control devices, more specifically to a beehive excluder.

2. Description of Related Art

BACKGROUND

Beekeeping, also known as apiculture, is the maintenance of bee colonies, commonly in man-made beehives. Most such bees are honey bees in the genus *Apis*, but other honey-producing bees such as *Melipona* stingless bees are also kept. A beekeeper, or apiarist, keeps bees in order to collect their honey and other products that the hive produce, such as beeswax, propolis, flower pollen, bee pollen, and royal jelly, and further to pollinate crops, or to produce bees for sale to other beekeepers. A location where bees are kept is called an apiary or "bee yard".

Beekeeping has an exceptionally long history as depictions of humans collecting honey from wild bees date to 10,000 years ago. Beekeeping in pottery vessels began about 9,000 years ago in North Africa. Domestication of bees is shown in Egyptian art from around 4,500 years ago. At some point humans began to attempt to domesticate wild bees in artificial hives made from hollow logs, wooden boxes, pottery vessels, and woven straw baskets or "skeps". Traces of beeswax are found in pot sherds throughout the Middle East beginning about 7000 BCE.

A beehive, within the meaning of this application, is an enclosed, man-made structure in which some honey bee species live and raise their young. Though the word beehive is commonly used to describe the nest of any bee colony, scientific and professional literature distinguishes a "nest" from "hive". Nest is used to discuss colonies which house themselves in natural or artificial cavities or are hanging and exposed. Hive is used to describe an artificial, man-made structure to house a honey bee nest.

In modern beekeeping, a Langstroth hive 10, an example of which is shown in FIG. 1, is any vertically modular beehive that has the key features of vertically hung frames, a bottom board 12 with entrance 14 for the bees, boxes containing frames for brood and honey (the lowest box for the queen to lay eggs, and boxes above where honey may be stored) and an inner cover and top cap to provide weather protection. Named for their inventor, Rev. Lorenzo Langstroth, Langstroth hives 10 are probably the most commonly used. The standard beehive used in many parts of the world for beekeeping is based on the Langstroth hive 10.

Rev. Lorenzo Langstroth patented his original design in the United-States on Oct. 5, 1852 as U.S. Pat. No. 9,300, which is incorporated herein by reference. In a Langstroth hive 10, the bees build honeycomb into frames, which can be moved with ease. The frames are designed to prevent bees from attaching honeycombs where they would either connect adjacent frames, or connect frames to the walls of the hive. The movable frames allow the beekeeper to manage the bees in a way which was formerly impossible. The key innovation responsible for the hive's design was the discovery of "bee space", a gap size of between 6-9 mm (¼-⅜ in) in which bees would neither build comb nor cement closed with propolis. Modern Langstroth hives 10 have different dimensions from Rev. Lorenzo Langstroth's beehive design that was manufactured until approximately 1920. Modern Langstroth hives 10 retain the main features of the original design of allowing bee space as well as easy access which works well for the bees but also makes management of the beehive 10 easier for the beekeeper.

A conventional hive entrance 14 is typically on the bottom board 12 with an entrance opening into the hive. Beekeepers can provide a reduced sized opening to assist in regulating the temperature of the hive and include an entrance or opening reducer. The opening reducer can sometimes be removed in the summer to allow for greater airflow, again for better temperature regulation of the hive.

Small rodents, mainly mice, are a serious pest of stored combs and may inhabit active honey bee colonies during the fall and winter months. A beehive 10 is a warm and dry place and is attractive to mice for winter lodging. During the warm months bees are guarding the entrance 14 of the hive 10 and mice and other rodents do not enter. As the weather cools bees start to cluster and the entrance 14 area is not guarded and then mice will move in and build nests causing extensive damage to frames and comb. These rodents chew combs and frames to make room for building their nests. Mice urinate on combs and frames, making bees reluctant to use the combs or clean out these nests in the spring. Thus when the bees are too slow-moving to defend the hive 10, the hive entrance 14 may be supplemented by the beekeeper with a mouse barrier, or rodent excluder, to keep mice out of the hive. A "rodent excluder" or simply an excluder within the meaning of this application is a rodent barrier for a beehive opening.

The existing rodent excluders 16 or barriers generally are metal plates with openings therein to allow entry and egress of the bees, or metal grids/mesh structures, examples of which are shown in FIGS. 2-3. The difficulty with these structures or excluders 16 is that they have sharp edges that tend to knock pollen off of the incoming bees and reduce total entrance area restricting bee flow that can inherently minimize honey production and detrimentally effect the efficiencies of the hive. This detrimental effect can often result in beekeepers delaying the implementation of the protective excluder 16 until the latest possible moment to minimize such loss, but delaying too long can result in mice infestation and significant damage to the hive 10.

There is a need for a simple effective excluder that prevents rodent intrusion into the hive and minimizes detrimental effects to hive production.

SUMMARY OF THE INVENTION

One aspect of the present invention provides a beehive excluder configured to be coupled to the opening of a beehive, comprising a body defining a first upper row of openings into a beehive and a second lower row of openings into the beehive, and wherein each opening of each row is configured to allow the bees to land and proceed through the opening without traversing a vertical abutment.

One aspect of the present invention provides a beehive excluder configured to be coupled to the opening of a beehive, comprising a one piece body defining at least one row of openings into a beehive and including clip members configured to couple the excluder to the beehive.

One aspect of the present invention provides a beehive excluder configured to be coupled to the opening of a beehive, comprising a body defining a first upper row of openings into a beehive and a second lower row of openings into the beehive, and wherein the body includes a dividing ridge extending the width of the excluder, and wherein a plurality of openings of the upper row and of the lower row includes vertical sidewalls extending from the dividing ridge and sloping toward the interior of the beehive in the direction away from the dividing ridge.

These and other advantages of the present invention will be clarified in the detailed description of the preferred embodiments taken together with the associated figures.

BRIEF DESCRIPTION OF THE FIGURES

FIG. 1 is a perspective view of a prior art Langstroth hive.

FIG. 2 is a perspective view of a prior art beehive rodent excluder.

FIG. 3 is a perspective view of another prior art beehive rodent excluder mounted on a Langstroth hive FIG. 4 is an enlarged perspective image of the opening in a prior art Langstroth hive FIG. 5 is a perspective image of a beehive excluder according to one embodiment of the present invention installed on an opening in a Langstroth hive FIG. 6 is a perspective image of a beehive excluder shown in FIG. 5.

FIG. 7 is an enlarged perspective view of a portion of a modified version of the beehive excluder of FIG. 6.

FIG. 8 is an enlarged front elevation view of a portion of the beehive excluder of FIG. 6.

FIG. 9 is a top perspective view of the beehive excluder of FIG. 6.

FIG. 10 is a schematic sectional view of the beehive excluder of FIG. 5 including the beehive.

FIG. 11 is a perspective view of the beehive excluder of FIG. 5 including the beehive and covers selectively attached thereto.

DETAILED DESCRIPTION OF THE PREFERRED EMBODIMENTS

It is noted that, as used in this specification and the appended claims, the singular forms "a," "an," and "the" include plural referents unless expressly and unequivocally limited to one referent. The various embodiments and examples of the present invention as presented herein are each understood to be non-limiting with respect to the scope of the invention. The term "about" used herein means+/− 10% of the stated number. Within the meaning of this application a "beehive excluder" is a device, such as the excluder 20 of the present invention, which is configured to be coupled to the opening of a beehive and designed to minimize the intrusion of rodents and other animals and objects into the hive. The prior art devices are generally referenced as rodent excluders as that was their primary function. The excluder 20 of the present invention is effective against rodent intrusion but also other animals and objects larger than the excluder openings. For example the excluder 20 of the present invention is also effective against large wasps and hornets. Consider for example, *Vespa man-darinia*, commonly called the murder hornet, which ranks as the world's largest hornet and is a particular threat to honey bees. A raiding party of several dozen murder hornets can kill a whole bee hive. The attackers can kill thousands of bees in just a few hours. The excluder 20 of the present invention improves the hive's natural defenses, increases its resistance to invasive species and as a result provides for better honey yield and increased rate of survivability.

The phrase "beehive opening" is inclusive of both the conventional hive entrance 14 (typically on the bottom board 12 with an entrance into the hive 10) into the beehive 10 and a functional opening into the beehive 10 through an entrance or opening reducer.

The present invention, as shown in FIGS. 4-11, can be described as a beehive excluder 20 (also described as a beehive rodent excluder 20, but as it as applications beyond rodent exclusion it is generally referenced as an excluder 20) configured to be coupled to the opening 14 of a beehive 10, comprising a body defining a first upper horizontal row of openings 22 into a beehive 10 and a second lower horizontal row of openings 24 into the beehive 10. The openings are sized to be small enough to exclude rodent entry, namely smaller than a mouse's skull, but large enough to easily allow entry of the bees. The openings 22 and 24 in the excluder 20 are rectangular in shape having a width of about 9 to 14 millimeters, more preferably 9 to 12 millimeters, and a height in the vertical direction of about 7 to 12 millimeters, more preferably 7 to 10 millimeters.

The present invention is better described with directions, which are generally relative to the beehive 10 orientation. A beehive opening 14 typically will be considered within this application to extend "horizontally" along a side of the beehive 10 with this direction also defining the width of the opening 14 and the width direction of the beehive excluder 20 according to the present application. In actuality the horizontal nature of the opening 14, and an included excluder 20, along the side of the beehive 10 the will likely depend upon the slope of the ground upon which it is positioned, however for the purpose of better understanding this invention this direction is considered horizontal. Similarly the vertical direction in this application is perpendicular to the horizontal direction in this application and generally extends along the height of the beehive 10, and the height of the excluder 20.

In the excluder 20 the body includes a dividing ridge 26 extending the width of the excluder 20 and separating the upper openings 22 from the lower openings 24. Most of the openings 22 and 24 of the upper row 22 and of the lower row 24 include a pair of vertical sidewalls 28 extending from the dividing ridge 26 and sloping toward the interior of the beehive in the vertical direction away from the dividing ridge 26 as easily shown in FIG. 10. The sloping of the sidewalls 28 allow for the excluder 20 to operate wherein each opening 22 or 24 of each row is configured to allow the bees to land and proceed through the opening 22 or 24 into the hive 10 without traversing a vertical abutment. For the upper openings 22 the bees can land on the divider 26 (or even the sides 28) and move through the opening 22 without encountering anything (like a vertical abutment) tending to knock pollen off of the bee. For comparison, openings punched into metal plates or wire mesh grids of known excluders 16 do not allow for this unobstructed movement into the hive 10, as the bees must navigate through the hole forming abutment without a landing location. Some known excluders 16 will have lower openings that open to the board 12, which do allow the bees to land on the board and enter these lower openings without a lower vertical abutment, but this minimizes these openings to only the lowermost openings.

Those openings 22 or 24 that are not bound by a pair of sidewalls 28, include one sidewall 28 and an opposing supporting structure 30 found at the lateral ends of the excluder 20 and in at least one intermediate location along the width of the excluder 20. In the intermediate location the supporting structure 30 defines a cut line 32 or dividing line 32 allowing the user to cut the excluder 20 to a smaller size to accommodate a known smaller width opening in a specific type of hive 10.

The body of the excluder 20 is a one piece molded structure. Further the plastic may further include materials to prevent, discourage and/or be resistant to chewing by rodents. For example the plastic may include glass fibers, minerals, carbon, carbon fibers, capsaicin, or other suitable fillers. The plastic may utilize UV resistant elements due increase operational life. The body of the excluder 20 has no sharp corners and is molded with rounded edges for minimizing the detrimental effect on the bees and on the honey production.

The body of the excluder 20 further includes clip members 34 configured to couple the excluder 20 to the beehive 10. The clip members 34 are formed at each supporting structure 30 and each is formed as a cantilevered extension member extending into the beehive opening 14 with an upwardly extending detent member on an inward distal end thereof. The clip members 34 allow the excluder 20 to be clipped onto a conventional hive 10 and will remain engaged therewith. The cantilevered structure allows some give (elastic spring) to the clip members 34 to accommodate attachment, and removal if necessary, of the excluder 20.

The beehive excluder 20 further includes a vertically extending stop plate 36 above the upper row of openings 22 and configured to substantially abut against an outer surface of the beehive 10 above the beehive opening 14. The stop plate 36 includes a plurality of fastener openings 38 configured to allow for securing the excluder 20 to the beehive 10 through mechanical fasteners (such as nails or screws, not shown). The stop plate 36 in one embodiment of the invention may include a plurality of pry points 40 that are not abutting against an outer surface of the beehive 10 to assist in removal of the excluder 20. Specifically, after installation of the excluder 10, for removal the fasteners (if any) are removed and the pry points 40 can then be used to remove the excluder 20 from the beehive 10 by disengaging the detents of the clip members 34. This process may be described as popping the excluder off of the beehive 10.

The beehive excluder 20 further includes a lower base 42 forming a lower end of the lower openings 24. All of the edges are tapered and smooth to eliminate surfaces tending to remove pollen from passing bees. The excluder 20 has an efficient duel level opening 22 and 24 design to maximize bee throughput and can remain on the beehive indefinitely. Covers 44, shown in FIG. 11 can clip onto segments of the excluder 20 to close off portions of the openings 24 and 22 as needed to assist in regulating hive temperature, or to assist in hive transport. The covers 44 form effective reducers for the hive 10. The covers 44 may have clips engaging openings 22 or 24 as an efficient coupling mechanism.

The present invention has been described with reference to specific details of particular embodiments thereof. It is not intended that such details be regarded as limitations upon the scope of the invention except insofar as and to the extent that they are included in the accompanying claims. A number of variations to the present invention will be apparent to those of ordinary skill in the art and these variations will not depart from the spirit and scope of the present invention. The scope of the invention is defined by the appended claims and equivalents thereto.

I claim:

1. A beehive excluder configured to be coupled to an opening of a beehive housing bees, the beehive excluder comprising: a body defining a first uppermost row of openings into the beehive, a dividing ridge extending a width of the beehive excluder adjacent the first uppermost row of openings, and a second lowermost row of openings into the beehive adjacent the dividing ridge and including a lower base forming a lower edge of the lowermost row of openings, wherein each of the openings of the first uppermost row of openings is configured to allow the bees housed within the beehive to land on the dividing ridge and proceed through the opening of the first uppermost row of openings without traversing a vertical abutment, wherein each of the openings of the second lowermost row of openings is configured to allow the bees housed within the beehive to land on the lower base and proceed through the opening of the second lowermost row of openings without traversing a vertical abutment, and clip members configured to couple the beehive excluder to the beehive, wherein the clip members are formed by a plurality of cantilevered extension members extending into the beehive opening with upwardly extending detent members on distal ends thereof.

2. The beehive excluder according to claim 1 wherein a plurality of the openings of the uppermost row of openings and a plurality of the openings of the lowermost row of openings include vertical sidewalls extending from the dividing ridge and sloping toward an interior of the beehive in a vertical direction away from the dividing ridge.

3. The beehive excluder according to claim 1 wherein the body is a one piece molded structure with no sharp edges.

4. The beehive excluder according to claim 3 wherein the body includes anti-chewing components to minimize rodent chewing.

5. The beehive excluder according to claim 1 further including a vertically extending stop plate above the uppermost row of openings and configured to abut against an outer surface of the beehive above the beehive opening.

6. The beehive excluder according to claim 5 wherein the stop plate includes a plurality of fastener openings configured to allow for securing the excluder to the beehive using mechanical fasteners.

7. The beehive excluder according to claim 5 wherein the stop plate includes a plurality of pry points that are not abutting against an outer surface of the beehive above the beehive opening to assist in removal of the excluder.

8. The beehive excluder according to claim 1 wherein the openings of the first uppermost row of openings are rectangular openings with no sharp corners, and wherein the openings of the second lowermost row of openings are rectangular openings with no sharp corners.

9. A beehive excluder configured to be coupled to an opening of a beehive housing bees, the beehive excluder comprising: a one piece body defining a first uppermost row of openings into the beehive, a dividing ridge extending a width of the beehive excluder adjacent the first uppermost row of openings, and a second lowermost row of openings into the beehive adjacent the dividing ridge and including a lower base forming a lower edge of the lowermost row of openings, wherein each of the openings of the first uppermost row of openings is configured to allow the bees housed within the beehive to land on the dividing ridge and proceed through the opening of the first uppermost row of openings without traversing a vertical abutment, wherein each of the openings of the second lowermost row of openings is configured to allow the bees housed within the beehive to land on the lower base and proceed through the opening of the second lowermost row of openings without traversing a vertical abutment, and including clip members configured to couple the excluder to the beehive, wherein the clip members are formed by a plurality of cantilevered extension members extending into the beehive opening with upwardly extending detent members on distal ends thereof.

10. The beehive excluder according to claim 9 wherein the body is a molded structure, and wherein a plurality of the openings of the uppermost row of openings and a plurality of the openings of the lowermost row of openings include vertical sidewalls extending from the dividing ridge and sloping toward an interior of the beehive in a vertical direction away from the dividing ridge.

11. The beehive excluder according to claim 10 further including a vertically extending stop plate above the uppermost row of openings and configured to abut against an outer surface of the beehive above the beehive opening, and wherein the stop plate includes a plurality of fastener openings configured to allow for securing the beehive excluder to the beehive via mechanical fasteners.

12. A beehive excluder configured to be coupled to an opening of a beehive housing bees, the beehive excluder comprising: a body defining a first uppermost row of openings into the beehive, a dividing ridge extending a width of the beehive excluder adjacent the first uppermost row of openings, and a second lowermost row of openings into the beehive, adjacent the dividing ridge and including a lower base forming a lower edge of the lowermost row of openings, wherein each of the openings of the first uppermost row of openings is configured to allow the bees housed within the beehive to land on the dividing ridge and proceed through the opening of the first uppermost row of openings without traversing a vertical abutment, wherein each of the openings of the second lowermost row of openings is configured to allow the bees housed within the beehive to land on the lower base and proceed through the opening of the second lowermost row of openings without traversing a vertical abutment, and wherein a plurality of the openings of the uppermost row of openings and a plurality of the openings of the lowermost row of openings includes vertical sidewalls extending from the dividing ridge and sloping toward an interior of the beehive in a vertical direction away from the dividing ridge, and clip members configured to couple the beehive excluder to the beehive, wherein the clip members are formed by a plurality of cantilevered extension members extending into the beehive opening with upwardly extending detent members on distal ends thereof.

13. The beehive excluder according to claim 12 wherein the body is a one piece molded structure, and wherein the openings of the first uppermost row of openings are rectangular openings with no sharp corners, and wherein the openings of the second lowermost row of openings are rectangular openings with no sharp corners.

14. The beehive excluder according to claim 13 further including covers selectively attachable to the body of the excluder to selectively reduce the number of accessible openings of the first uppermost row of openings or the second lowermost row of openings, and defined cut lines within the body to allow the user to selectively reduce the width of the excluder.

* * * * *